United States Patent [19]

Kuhne et al.

[11] Patent Number: 5,318,478
[45] Date of Patent: Jun. 7, 1994

[54] ELASTIC CLUTCH OF DISK DESIGN

[75] Inventors: Viktor Kuhne, Bopfingen; Rolf Brockmann, Heidenheim, both of Fed. Rep. of Germany

[73] Assignee: J. M. Voith GmbH, Heidenheim, Fed. Rep. of Germany

[21] Appl. No.: 898,797

[22] Filed: Jun. 15, 1992

[30] Foreign Application Priority Data

Jun. 15, 1991 [DE] Fed. Rep. of Germany ....... 4119791

[51] Int. Cl.⁵ .......................... F16D 3/12; F16D 13/60
[52] U.S. Cl. .................................... 464/64; 192/106.2
[58] Field of Search .................................. 464/62–68; 192/106.2; 74/574

[56] References Cited

U.S. PATENT DOCUMENTS

| | | | |
|---|---|---|---|
| 4,530,673 | 7/1985 | Lamarchi | 464/68 X |
| 4,591,348 | 5/1986 | Takeuchi | 464/64 |
| 4,891,033 | 1/1990 | Heyser | 464/68 |
| 5,038,906 | 8/1991 | Minbu | 464/64 X |

FOREIGN PATENT DOCUMENTS

| | | |
|---|---|---|
| 2727725 | 1/1979 | Fed. Rep. of Germany ... 192/106.2 |
| 3635043 | 7/1988 | Fed. Rep. of Germany . |
| 3916575 | 11/1990 | Fed. Rep. of Germany . |
| 589989 | 7/1947 | United Kingdom .................. 464/64 |
| 2159241 | 11/1985 | United Kingdom . |

Primary Examiner—Daniel P. Stodola
Attorney, Agent, or Firm—Baker & Daniels

[57] ABSTRACT

An elastic clutch of disk design is used with a divided flywheel for an internal combustion engine having two clutch halves which are rotatable relative to each other and include several cutouts about their circumference. Helical springs are disposed in a parallel and nested manner and upon mutual rotation of the two clutch halves are operable essentially simultaneously. The elastic clutch elements include a main spring and at least two partial springs which are arranged within the main spring. A one-part or multiple-part guide component disposed between the partial springs centers the partial springs and supports them in relation to the main spring.

6 Claims, 2 Drawing Sheets

ELASTIC CLUTCH OF DISK DESIGN

BACKGROUND OF THE INVENTION

1. Field of the Invention

The present invention is directed to an elastic clutch of disk design used in conjunction with a split flywheel for an internal combustion engine, and, more particularly, to an elastic clutch of disk design having a plurality of elastic clutch elements respectively disposed within a plurality of cutouts formed in the circumference of the split flywheel.

2. Description of the Related Art

Elastic clutches of disk design used in conjunction with a split flywheel for an internal combustion engine are known in the art, e.g., DE-PS 36 35 043. Such clutches segregate the rotational vibrations of the internal combustion engine from the drive train connected thereto. The elastic clutch elements of the clutch may be formed having suitable elastic properties so as to have an effect on the operating and resonance performance of the entire drive train. The elastic clutch elements, which preferably are fashioned as helical springs, serve primarily to transfer the torque of the internal combustion engine to the drive train.

Congested installation conditions in modern drive trains and the tendency for internal combustion engines to have ever higher engine torques mandates optimal utilization of the space available for the clutch; this in turn requires accommodating a maximum spring volume within a minimum space.

One approach for maximizing the spring volume within a given design space is to arrange the helical springs within one another in a nested fashion. This approach has proven satisfactory in the dampers of classic clutch disks since relatively short springs are used with such clutches.

Long helical springs, which are preferably used in an engine having a split flywheel, display a much more unfavorable wear performance than the relatively short springs used in classic clutch disks. The unfavorable spring wear makes it necessary to use a more expensive spring guide, especially if the springs operate dry or with poor lubrication.

DE-PS 36 35 043 and DE-PS 39 16 575, both of which are incorporated herein by reference, disclose helical spring guides for individual helical springs which reduce the possibility of buckling of the springs under centrifugal force and may consist of selected materials forming a suitable pairing with the helical springs. Such spring guides minimize the spring wear and increase the fatigue strength of the clutch.

What is needed in the art is a spring guide for nested helical springs which substantially prevents the helical springs from touching one another and minimizes the wear of the helical springs and spring guide.

SUMMARY OF THE INVENTION

The present invention provides an elastic clutch having at least two inner springs nested within a main spring, and a guide component disposed between the inner springs and within the main spring for centering and supporting the inner springs.

A large helical spring, or main spring, is engaged at both ends thereof by a spring cup. An inner helical spring, or inside spring, consists of several springs, and preferably of two identical springs. Located between the inner springs is a guide component which guides and centers the inner springs within the main spring and is able to support them, preferably in a radial direction, relative to the main spring. Coordinated with the spring cup, the ends of the inner springs are centered, or supported, in analogy to the guide component. The guide component and the spring cups are of a design such that contact between the main spring and inner springs is extensively avoided.

The guide component may be of single-part of multiple-part design. To improve the geometric adaptability of the inner springs relative to the main spring it may be favorable to configure the guide component with a joint, for example, a ball joint. Obtained thereby is a certain movability while at the same time centering the inner springs radially inward of the main spring.

The invention comprises, in one form thereof, an internal combustion engine having a divided flywheel. An elastic clutch in two clutch halves rotatable relative to each other. The clutch halves are formed with a plurality of cutouts about their circumference. Elastic clutch elements including a main spring and at least two inner springs are disposed radially within and substantially coaxial with the main spring. The elastic clutch elements are disposed in the cutouts and operable upon mutual rotation of the two clutch halves. A guide component is disposed between the at least two inner springs and mutually centers and supports the at least two partial springs within the main spring.

An advantage of the present invention is that the inner springs can be dimensioned such that the guide component, in the deflection of the entire spring packet, performs relative to the main spring pointwise no relative movements and overall only such that are negligible, which has a positive effect on the wear.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
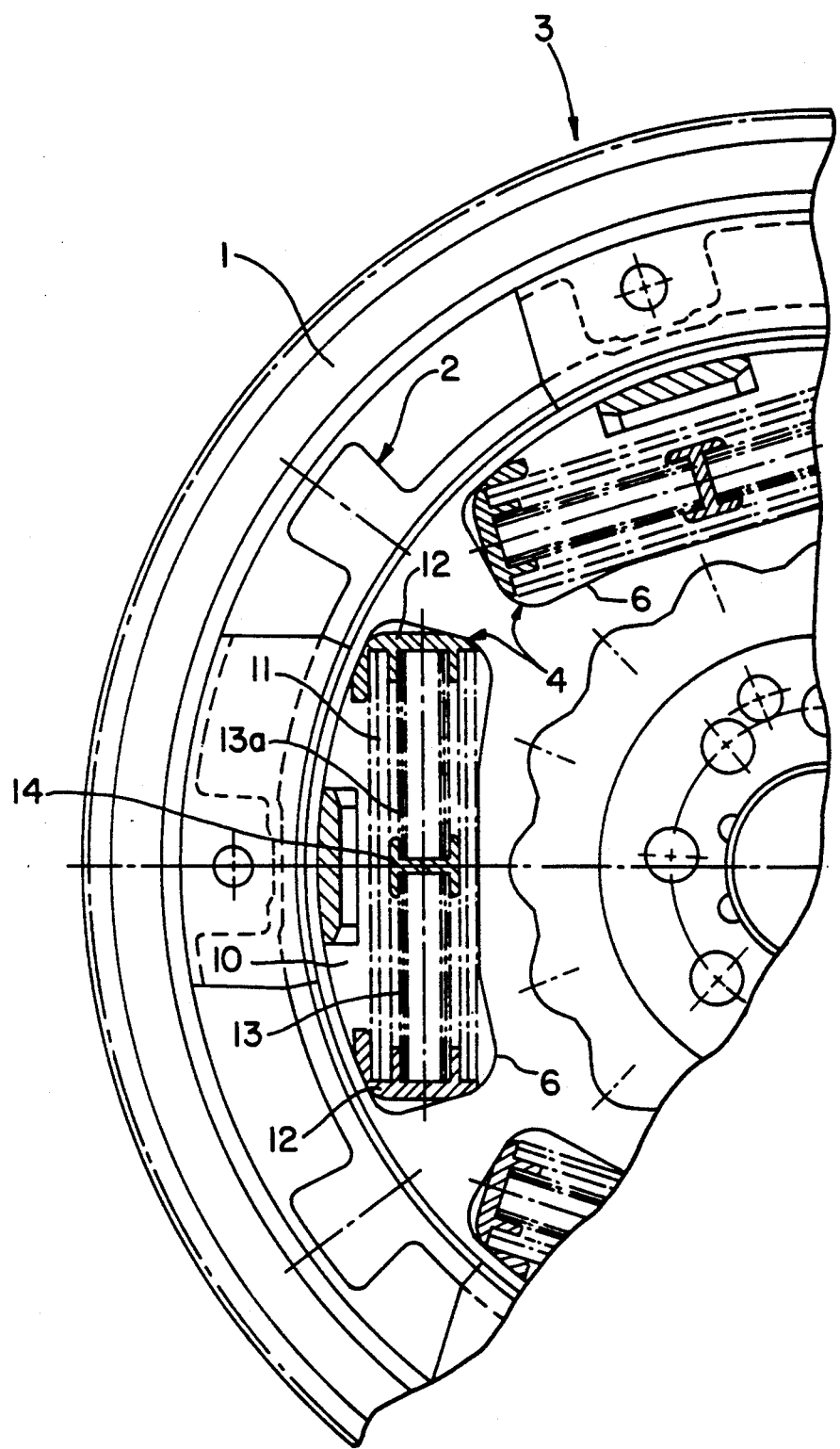
FIG. 1 is a fragmentary sectional view illustrating the elastic clutch of the present invention having a one-piece guide component.
Figure 2:
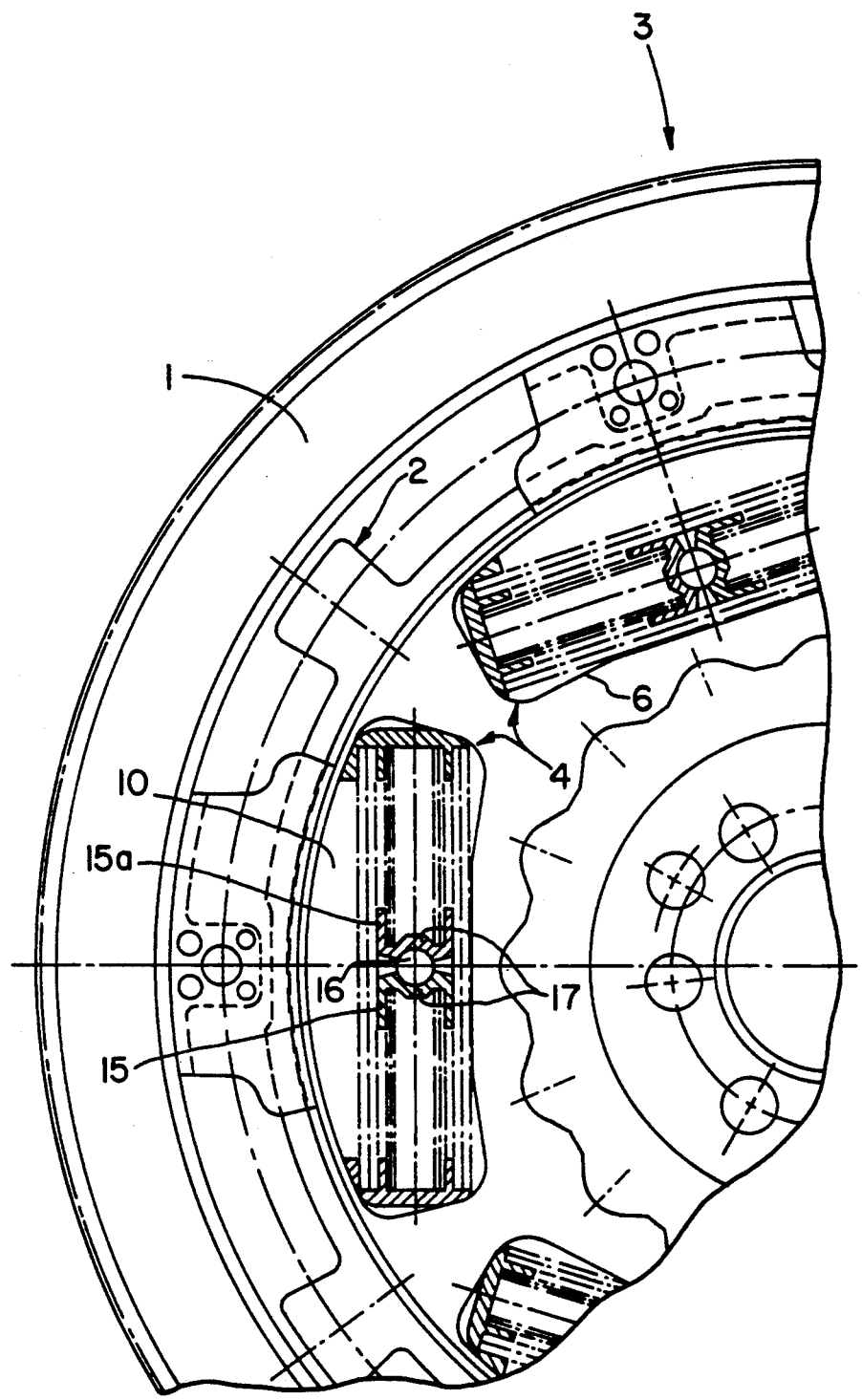
FIG. 2 is an alternative embodiment of the present invention illustrating an elastic clutch a three-piece guide component.

Referring now to the drawings, and particularly to FIGS. 1 and 2, there is shown an elastic clutch 3 of the present invention which may be used with an internal combustion engine having a divided flywheel. The elastic clutch includes two clutch halves 1 and 2 which are rotatable relative to each other. Clutch halves 1 and 2 are formed with a plurality of cutouts 6 about their circumference for receiving elastic clutch elements 4. The elastic clutch elements 4 are helical springs 11 and 13 which are respectively disposed in the cutouts 6 in a parallel, nested manner. The elastic clutch elements 4 are simultaneously operable upon mutual rotation of the two clutch halves 1 and 2.

FIG. 1 shows a spring packet comprised of the main spring 11, spring cups 12, two inner springs 13 and 13a and a one-piece guide component 14. Spring 11 cups 12 center the main spring and the inner springs 13 and 13a. The one-piece guide component 14 engages and centers inner springs 13 and 13a and servers to support them in relation to the main spring.

An alternative embodiment of the spring packet is illustrated in FIG. 2. A three-piece guide component having a three-piece design includes a ball joint formed by a ball 16 engaging and disposed between shells 17 of guide component pieces 15 and 15a.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An elastic clutch of disk design for an internal combustion engine having a divided flywheel, comprising:

two clutch halves rotatable relative to each other and formed with a plurality of cutouts distributed about their circumference;

elastic clutch elements comprising a main spring and at least two inner springs disposed radially within the main spring in a parallel, nested manner, said at least two inner springs having substantially identical spring behavior under load, said elastic clutch elements disposed respectively in the cutouts and operable upon mutual rotation of the two clutch halves; and a substantially non-resilient guide component disposed between said at least two inner springs and within said main spring, said guide component engaging two of said at least two inner springs and mutually centering and supporting said at least two inner springs within said main spring.

2. The elastic clutch of claim 1, further comprising a spring cut engaging an end of said main spring and centering and supporting said main spring and inner springs in a radial direction.

3. The elastic clutch of claim 1 wherein said guide component is a three-piece guide component including two shells and a ball disposed between said shells, said shells having limited movement relative to each other.

4. The elastic clutch of claim 1 wherein said guide component supports said at least two inner springs in a radial direction with respect to the main spring.

5. The elastic clutch of claim 1, wherein said guide component comprises opposite axial surfaces engaging two of said at least two inner springs, said opposite axial surfaces substantially non-movable in an axial direction relative to each other.

6. An elastic clutch of disk design comprising:

two clutch halves rotatable relative to each other and formed with a plurality of cutouts distributed about their circumference;

elastic clutch elements comprising a main spring and at least two inner springs disposed radially within the main spring in a parallel, nested manner, said at least two inner springs having substantially identical spring behavior under load, said elastic clutch elements disposed respectively in the cutouts and operable upon mutual rotation of the two clutch halves; and a one-piece guide component disposed between said at least two inner springs and within said main spring, said guide component engaging two of said at least two inner springs and mutually centering and supporting said at least two inner springs within said main spring.

* * * * *